(12) United States Patent
Xu

(10) Patent No.: US 9,383,545 B2
(45) Date of Patent: Jul. 5, 2016

(54) EXTERNAL LENS DEVICE FOR HANDHELD SMART DEVICES

(71) Applicant: Ye Xu, Sugar Land, TX (US)

(72) Inventor: Ye Xu, Sugar Land, TX (US)

(*) Notice: Subject to any disclaimer, the term of this patent is extended or adjusted under 35 U.S.C. 154(b) by 28 days.

(21) Appl. No.: 14/274,506

(22) Filed: May 9, 2014

(65) Prior Publication Data
US 2015/0192757 A1  Jul. 9, 2015

Related U.S. Application Data

(60) Provisional application No. 61/946,513, filed on Feb. 28, 2014, provisional application No. 61/924,479, filed on Jan. 7, 2014.

(51) Int. Cl.
| | | |
|---|---|---|
| H04N 5/225 | (2006.01) | |
| G03B 17/12 | (2006.01) | |
| G02B 7/16 | (2006.01) | |
| G02B 7/02 | (2006.01) | |
| G02B 27/00 | (2006.01) | |

(52) U.S. Cl.
CPC ........ *G02B 7/16* (2013.01); *G02B 7/026* (2013.01); *G02B 27/0006* (2013.01)

(58) Field of Classification Search
CPC ...... G02B 7/16; G02B 7/026; G02B 27/0006; G03B 17/12; G03B 17/14; H04N 5/2254; H04N 5/2171
USPC .......... 348/360, 361, 335, 345, 373–376, 348/240.99, 240.3, 347; 359/821; 396/74, 396/79, 529, 544, 72, 73
See application file for complete search history.

(56) References Cited

U.S. PATENT DOCUMENTS

| | | | | |
|---|---|---|---|---|
| 5,406,413 A * | 4/1995 | Mogamiya | ............ | G03B 17/02 359/507 |
| 6,339,680 B1 * | 1/2002 | Mauvais | ............... | G03B 19/04 352/85 |
| 6,501,909 B1 * | 12/2002 | Nishimura | ............... | G02B 7/10 396/74 |
| 7,990,469 B2 * | 8/2011 | Clapper | ............... | H04N 5/2251 348/374 |
| 9,294,660 B2 * | 3/2016 | O'Neill | ............... | H04N 5/2254 |
| 2003/0164895 A1 * | 9/2003 | Viinikanoja | ......... | G02B 13/009 348/375 |
| 2003/0185551 A1 * | 10/2003 | Chen | ........................ | G02B 7/14 396/73 |
| 2004/0218081 A1 * | 11/2004 | Lohr | ........................ | G02B 7/00 348/335 |
| 2005/0101348 A1 * | 5/2005 | Wang | .................... | G02B 13/001 455/556.1 |
| 2008/0088732 A1 * | 4/2008 | Lin | .................... | H04N 5/23296 348/347 |
| 2008/0226286 A1 * | 9/2008 | Huang | .................... | G03B 17/12 396/529 |
| 2009/0181729 A1 * | 7/2009 | Griffin, Jr. | ............. | H04N 5/2254 455/575.1 |
| 2013/0130753 A1 * | 5/2013 | Springer | ................. | G03B 17/14 455/575.1 |
| 2013/0177304 A1 * | 7/2013 | Chapman | .............. | G03B 17/565 396/533 |
| 2015/0222315 A1 * | 8/2015 | O'Neill | ................ | H04B 1/3888 455/575.8 |

* cited by examiner

*Primary Examiner* — Tuan Ho
*Assistant Examiner* — Marly Camargo
(74) *Attorney, Agent, or Firm* — Benjamin Aaron Adler

(57) ABSTRACT

Provided herein are devices for enhancing camera functionality on a handheld smart device, such as a smartphone. An external lens device comprises a base plate removably securable to a mount on the smart device which has a turntable attached thereto and rotatable thereon. Lens holders with lenses are disposed within the turntable and each can swivel outwardly to dock over the camera lens on the smart device. A cover secures and protects the lens holders and lenses within the turntable. Also provided is a cleaning device securable to the smart device as is the external lens device. The cleaning device comprises a platform securable to the mount on the smart device and a cleaning pad disposed on the platform. Further provided is a handheld camera system comprising a smart device with mount as described, the external lens device and the cleaning device.

19 Claims, 15 Drawing Sheets

EXTERNAL LENS DEVICE FOR HANDHELD SMART DEVICES

CROSS-REFERENCE TO RELATED APPLICATIONS

This nonprovisional application claims benefit of priority under 35 U.S.C. §119(e) of provisional application U.S. Ser. No. 61/946,513, filed Feb. 28, 2014, and of provisional application U.S. Ser. No. 61/924,479, filed Jan. 7, 2014, the entirety of both of which is hereby incorporated by reference.

BACKGROUND OF THE INVENTION

1. Field of the Invention

The present invention relates generally to the fields of handheld smart electronic devices and digital photography and videography. More specifically, the present invention relates to devices, apparatuses and systems comprising camera lenses that are removably attachable to the back of a handheld smart device and alignable with the smart device camera lens.

2. Description of the Related Art

In today's societey, digital smart devices such as mobile phones, tablet computers and other digital products have become common daily necessities. Today digital cameras are a standard component of smart devices. However, due to structural limitations, the feature may be little more than "point and click" and unable to take more complex shots utilizing different types of lenses, etc. Moreover, the positioning of the camera lens on a smart device, for example, a smartphone, often precludes the use of such accessories.

Devices to enhance the photographic or videographic capabilities of the smart device camera have been devised. For example, a set of three lenses have been rotatably affixed to a smartphone case (www.hamacher.com; Item 84394). When the smartphone is positioned within the case, a lens comprising a three-lens dial can be rotated to align with the smartphone camera lens. However, the three lens dial and lenses are permanently affixed to the case and each lens must have a lens cap to protect it. Moreover, the smartphone in combination with the three-lens case cannot be carried on, for example, a belt holster because the dial has dimensions that extend beyond the width of the smartphone.

Thus, there is a recognized need in the art for an external lens system for a handheld smart device, such as a smartphone, that enhances camera functionality without altering the footprint of the smart device. Particularly, the prior art is deficient in devices and systems comprising a plurality of camera lenses that can be removably and rotatably attached to back of the handheld device to enhance the existing camera on a handheld smartphone. The present invention fulfills this longstanding need and desire in the art.

SUMMARY OF THE INVENTION

The present invention is directed to an external lens device for a smart device. The device comprises a base plate removably securable to a mount on the smart device and a turntable attached to and rotable on the base plate. A plurality of lens holders are disposed on the turntable in a swiveling relationship therewith and a plurality of lenses each are secured within a lens holder. A cover is disposed in covering relationship to the lens holders and is attached thereto.

The present invention also is directed to a cleaning device for a screen on a smart device. The cleaning device comprises a platform removably securable to a mount on the smart device and a cleaning pad affixed to a lower surface of the platform. In a related cleaning device the cleaning pad further comprises a dry cleaning compound impregnated therein.

The present invention is directed further to a handheld camera system. The system comprises a smart device having a mount formed on the back side thereof and the external lens device and the cleaning device as described herein removably and interchangeably securable to the mount.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1A:
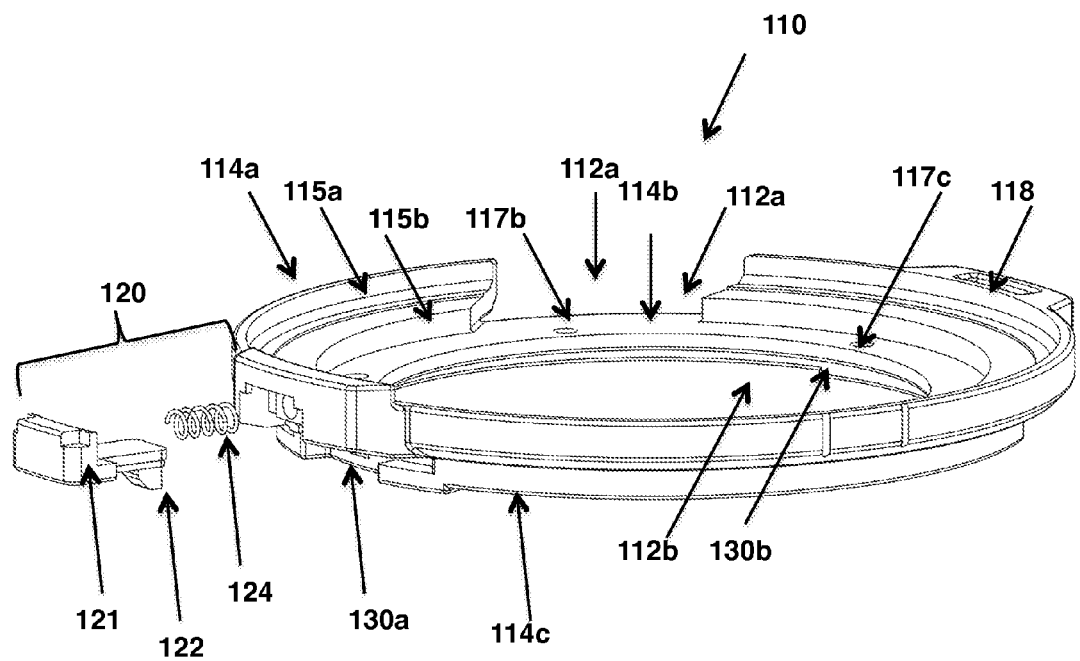
FIGS. 1A-1B are a perspective view of the base plate with an exploded (FIG. 1A) and assembled (FIG. 1B) views of the release mechanism for the external lens device.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention, there is provided an external lens device for a smart device, comprising a base plate removably securable to a mount on the smart device; a turntable attached to and rotable on the base plate; a plurality of lens holders disposed on the turntable in a swiveling relationship therewith; a plurality of lenses each secured within a lens holder; and a cover disposed in covering relationship to the lens holders and attached thereto.

In this embodiment, the base plate may comprise a substantially circular body having a plurality of rims defining open upper and lower surfaces on the body, where the plurality of rims comprise a first rim with an upwardly vertical portion having an opening therethrough and a flange portion extending laterally and inwardly from said vertical portion; a second rim disposed under and in contact with the flange portion of the first rim and extending laterally and inwardly therefrom, the second rim having a plurality of stops formed around the upper surface thereof; and a third rim disposed under and in contact with the second rim and having a diameter equal to or less than that of the second rim, the third rim having means for removably engaging the mount formed on an outer edge thereof; a release mechanism disposed on the first rim; and a slot formed from the first rim in opposite relationship to the release mechanism.

In an aspect of this embodiment, the release mechanism may comprise a push button with a flanged end in combination with a spring and is positioned on the first rim such that the flanged end extends into the engaging means on the third rim. In this aspect the engaging means may comprise two pairs of L-shaped slots disposed in opposite relationship on the exterior of the third rim.

Also in this embodiment the turntable may comprise an upper lens plate having a substantially circular upper plate portion having a lip on an outer edge thereof such that the upper plate portion is seated on both of the flange portion of the first rim and the second rim; a circular lower plate portion seated within the open lower surface formed by the second rim; and a plurality of attachment openings disposed through the upper and lower plate portions; and a lower lens plate seated within the open lower surface formed by the third rim and having a plurality of attachment openings on an upper surface thereof in alignment with the attachment openings on the upper lens plate, where the lower lens plate is attached to the upper lens plate via the aligned attachment openings such that the upper and lower lens plates rotate together around the first and second rims.

In an aspect thereof the upper lens plate may comprise a plurality of arms with arcuate exterior contours radially extending from a center thereof and defining a plurality of lens plate openings with arcuate interior contours between the arms, each of the lens plate openings sequentially alignable with the first rim opening as the turntable is rotated. Further to this aspect the upper lens plate may comprise on each arm a stop raised from the surface of the arm with dimensions that match a corresponding depression on the lens holder; a spacer having an arcuate exterior contour disposed on the edge of the arm extending upwardly therefrom and comprising an attachment opening on an upper surface thereof; a first sleeve extending upwardly from the upper lens plate having an attachment opening disposed on an upper surface thereof and having a spring disposed around the exterior thereof; a second sleeve extending downwardly through the upper and lower lens plates and having an open lower surface; and a spring and bearing combination disposed within the second sleeve, said bearing having dimensions matching the stops comprising the second rim such that the turntable remains in position on the base plate after the bearing engages the second rim stop after the turntable is rotated.

Furthermore in this embodiment the lens holder may have an elongate body with an exterior arcuate contour comprising a lens holding portion having a lens secured therein and a lip formed between upper and lower edges of the exterior arcuate contour; a securing portion having an opening therethrough, where the first sleeve and spring are disposed therein; and a flanged clip disposed on a lower surface of the securing portion proximate to the lens holding portion and depending downwardly therefrom. In an aspect thereof a lifting action on the lip on the lens holding portion causes the lens holder to swivel outwardly around the first sleeve such that the flanged clip is releasably clippable to the slot on the first rim and the lens is securely positioned in front of a camera lens on the smart device. In another aspect the lens holders may be positioned on the upper lens plate between the spacers such that the exterior arcuate surfaces of the lens holders and the spacers form a substantially continous arcuate surface around the base plate.

Further still in this embodiment the cover may comprises a circular lower covering plate having outer and inner rims raised circumferentially around an upper surface thereof and comprising a plurality of anchors disposed on a lower surface thereof in alignment with the attachment openings comprising the spacers and anchored within; a plurality of openings disposed between the outer and inner rims and alignable with the attachment openings on the first sleeve; a plurality of screws disposed through the cover openings and secured within the attachment openings; and a circular upper covering plate having an open center disposed between the outer and inner rims.

Further still in this embodiment, the mount may have a substantially circular body with an open upper surface formed from a back of the smart device and may comprise means for receiving the engaging means comprising the first rim. In an aspect thereof the receiving means may comprise two pairs of L-shaped slots disposed in opposite relationship on an interior side surface of the mount. In another aspect when the base plate is secured to the mount, the opening in the first rim is positioned proximate to the camera lens.

In all embodiments the lenses may be a wide-angle lens, a telephoto lens or a fisheye lens. Also, the smart device may be a smartphone or a tablet.

In another embodiment of the present invention there is provided a cleaning device for a screen on a smart device, comprising a platform removably securable to a mount on the smart device; and a cleaning pad affixed to a lower surface of the platform. Further to this embodiment the cleaning pad may comprise a dry cleaning compound impregnated therein. In both embodiments and aspects thereof the smart device may be a smartphone or a tablet.

In both embodiments the platform may have a circular body comprising an upper platform portion having a release mechanism and a kickstand disposed on an upper surface thereof; and a lower platform portion with a diameter less than that of the upper platform and having means for removably engaging the mount formed on an outer edge thereof. In an aspect of this embodiment the release mechanism may comprise a lever end and a flanged end, where the release mechanism is positioned on the upper platform such that the flanged end extends into the engaging means on the lower platform.

Also in both embodiments the mount may have a substantially circular body with an open upper surface formed from a back of the smart device and may comprise means for receiving the engaging means comprising the lower platform portion. In an aspect thereof the engaging means and the receiving means each may comprise two pairs of L-shaped slots, where two of the pairs are disposed in opposite relationship on the lower platform portion and the other two of the pairs are disposed in opposite relationship on an interior side surface of the mount.

In yet another embodiment of the present invention, there is provided a handheld camera system, comprising a smart device having a mount formed on the back side thereof; the external lens device as described supra removably securable to the mount; and a cleaning device removably securable to the mount.

In this embodiment the the cleaning device may comprises a circular platform with an upper platform portion having a release mechanism and a kickstand disposed on an upper surface thereof and a lower platform portion with a diameter less than that of the upper platform and having means for removably engaging the mount formed on an outer edge thereof. In an aspect of this embodiment the release mechanism may comprise a lever end and a flanged end disposed on the upper platform such that the flanged end extends into the engaging means on the lower platform. In another aspect the engaging means may comprise two pairs of L-shaped slots disposed in opposite relationship on the lower platform portion.

Provided herein are external lens devices and camera systems configured to enhance the camera functionality in a handheld smart device, such as a smartphone. The external lens device is a multi-lens device comprising a plurality of different lens types. Removably attached or secured to the smart device, a user has a system configured to quickly and easily utilize a specialty lens to enhance a photographic or videographic opportunity. For example, the lens may be a specialty lens such as, but not limited to, a wide-angle lens, a telephoto lens or a fisheye lens.

One particular system comprises a rotatable turntable structure having swiveling holders containing the camera lenses and a mount disposed on the smart device. The external lens device comprises a base or base plate structurally configured to removably attach to the mount. Generally, the external lens device is circular and has a diameter about that of, but no greater than, the width of the mount on the smart device, neither of which exceed the length and width of the surface of the smart device. Thus the external lens device when attached to the mount does not restrict a user's holding the smart device. Furthermore, the components of the external lens device can be manufactured from light-weight, but sturdy materials. This adds a minimum of weight to the existing smart device and enables a better user experience.

The external lens device is easily attached to or secured to and removable from the mount as described herein. When attached or secured to the handheld smart device, a user can rotate the turntable on its base to position the appropriate lens proximate to the camera lens on the smart device. A lens of interest may be swiveled out from the device to dock in front of and in alignment with the smart device camera lens. The docked lens may be releasably secured in position.

The combination of the rotatable turntable on the base plate is such that a lens must be rotated to a specific orientation on the base plate for it to be swiveled out for docking. This keeps the other lenses secure within the turntable. When a user has finished with the external lens device, the turntable is rotated to the next stop which prevents any lens from swiveling out of the turntable and becoming scratched or otherwise damaged. In addition to the means for stopping the rotation of the turntable, the turntable comprises stops to secure the lens holders within the device.

When not in use, the lenses are completely contained within the device and do not protrude from the surface so that a smooth surface matching the contour of the external lens device is formed. This protects the lenses from damage. When in use, the lens extends no farther out from the back of the smart device than the external lens device extends from the mount. The external lens device can be configured to hold or support other lenses or accessories useful with a handheld smart device camera.

Thus, when not in use the external lens device may be removed and safely stored and easily transported until the next photographic or videographic opportunity. The lenses are further protected because they are not carried around on the smart device when not in use. Moreover, the mount is formed in place on the smart phone and does not interfere with carrying the smart phone in a belt holster, case or pocket, etc.

The external lens device comprises means, such as, but not limited to, slots or slot-like mechanisms to engage the mount with a twist of the device. The mount is disposed on the smart device proximate to the camera lens and has dimensions not exceeding the surface dimensions of the smart device. The mount comprises a complementary means or mechanism to that on the base of the turntable to receive and engage with the mechanism on the device.

Alternatively, the mount may be formed on a protective cover as on the smart device. The protective cover is designed to removably attach to the existing back cover of the handheld device or to replace it. The protective cover may have dimensions sufficient to slide over the back of the smart device with an opening that aligns with the camera lens.

Also provided herein is a device for cleaning the screen of the smart device. The cleaning device comprises a cleaning pad and is structurally configured to engage the mount for the external lens device. The cleaning device comprises a supporting platform or base on which a cleaning pad is permanently or removably affixed by known and standard methods. The supporting base may also have a kickstand as is known in the art affixed thereto. The supporting base is removably securable to the mount via the means that secure the external lens device to the mount as described herein. The supporting base may be manufactured from the light-weight, but sturdy materials, as is the external lens device.

The dimensions of the cleaning device do not exceed the surface dimensions of the smart device and of the screen on the smart device. The cleaning device may be carried on the smart device without interfering with carrying the smart phone in a belt holster, case or pocket, etc. With the kickstand disposed thereon, the cleaning device when secured to the mount also provides a means of standing or supporting the smart device on a surface. The cleaning device can be easily and quickly removed to clean the smart device screen and/or to be replaced with the external lens device as required or desired by a user.

The cleaning device is removably securable to the mount such that the cleaning pad is stored and protected within a cavity formed when the cleaning device is secured to the mount. Particularly, one advantage of the cleaning device is that a dry cleaning compound is utilized in the cleaning pad that is long-lasting and self-replenishing. This is an improvement over cleaning systems that utilize wet cleaning agents. The dry cleaning compounds of the present invention have a longer shelf life than corresponding wet cleaning agents. The dry-cleaning compound is impregnated in the cleaning pad and comprises a solvent-free, organic compound that is harmless to coatings such as anti-reflective coatings and oleophobic coatings. Another advantage of the cleaning device is that the pad utilized as the cleaning member comprises a soft, natural material that will not scratch or otherwise affect the finish of the screen.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1A is a structural view of the base plate for the external lens device. In FIG. 1A the base plate 110 comprises a substantially circular body having open upper and lower surfaces 112a,b. The circular body comprises, in a layered configuration around the circular body, an upper flanged first rim 114a extending perpendicularly or vertically upwardly around the circumference of the circular open body, a second rim 114b under the first rim and extending inwardly and perpendicularly or horizontally therefrom and a third rim 114c under the second rim and extending downwardly from the second rim disposed around the circumference and The first rim 114a comprises a vertical portion 115a or component and a flange portion 115b or component extending inwardly around its inner circumference and perpendicularly therefrom and disposed on the upper surface of the third rim. The first rim has an opening 116 that is alignable with one of the arcuate openings 216a,b,c, 254a,b,c on the rotatable lens turntable 200 through which a lens can be rotated outwardly (see FIGS. 2A-2B). A receiving means such as a slot 118 or bracket, is disposed on or formed from the outer surface of the first rim and is structurally configured to receive a flanged clip 312a,b,c disposed on the lens holders 300a,b,c (see FIGS. 3A-3C). A release mechanism 120 is disposed on the outer surface of the first rim in opposite relationship to the receiving means. The release mechanism comprises a push button 121 with a flanged end 122 and spring 124 combination such that when pushed the flanged end moves away from the mount 600 (see FIGS. 6A-6B) and the external lens device is released from the mount base.

The second rim 114b has an inner diameter smaller than that of the flange portion of the first rim and as positioned under the flange forms a stepped configuration with the first rim. The second rim comprises a plurality of depressions, as represented by 117a,b,c, disposed around the upper surface thereof. The depressions comprise stops and are structurally configured to receive the corresponding bearings 247a,b,c (see FIG. 2A) when the turntable is rotated. This secures the turntable sufficiently to keep it from rotating unless turned by a user.

The third rim 114c has an outer diameter less than that of the first rim but equivalent to the inner diameter of the mount 600. The third rim comprises an engaging means structurally configured for removably attaching or securing the external lens device to the structurally corresponding L-shaped slot receiving means on the mount (see FIGS. 6A-6B). The engaging means comprises two pair of slots 130a,b, such as L-shaped slots or reverse L-shaped slots, formed on the outer surface of the third rim, each pair in opposite relationship and proximate to the release mechanism and flanged clip 312a,b,c (see FIG. 3A) receiving means 118. In combination with the corresponding receiving means 630a,b on the mount 600 (see FIG. 6A), the external lens device is aligned with the mount and twisted to removably secure the foot of the L-shaped slot within same to the mount.

Figure 1B:
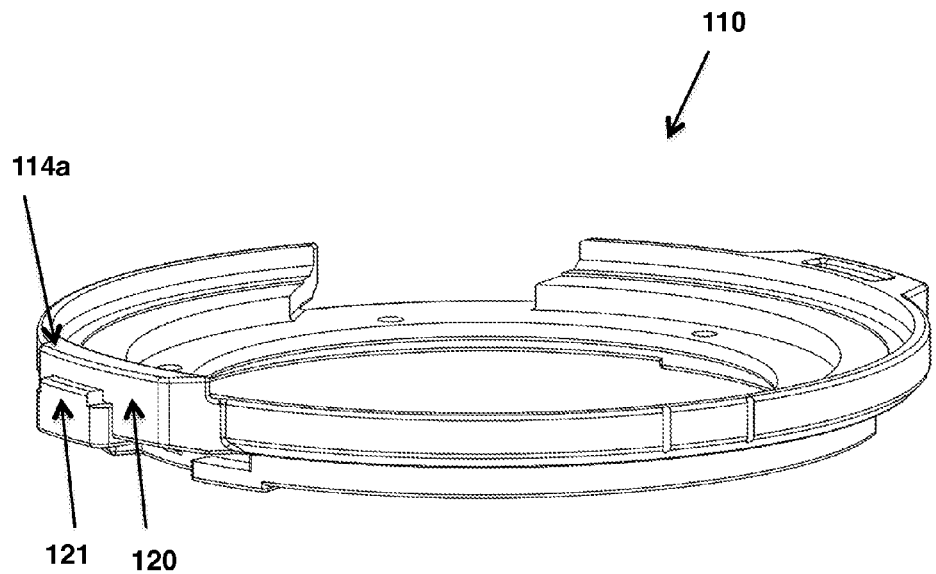

FIG. 1B illustrates the disposition of the assembled release mechanism 120 on the first rim 114a of the base plate 110. The push button 121 is flush with the first rim such that the flanged end extends into one of the L-shaped slots (see FIG. 5A). When the L-shaped slots are engaged with those on the mount, the flanged end secures or clips to the foot via action of the spring 124 (see FIG. 1A). When the push button is pushed inwardly, the spring pushes the flange laterally away from the foot, allowing the external lens device to be twisted away and out of the corresponding L-shaped slots on the mount to be released from the same.

Figure 2A:
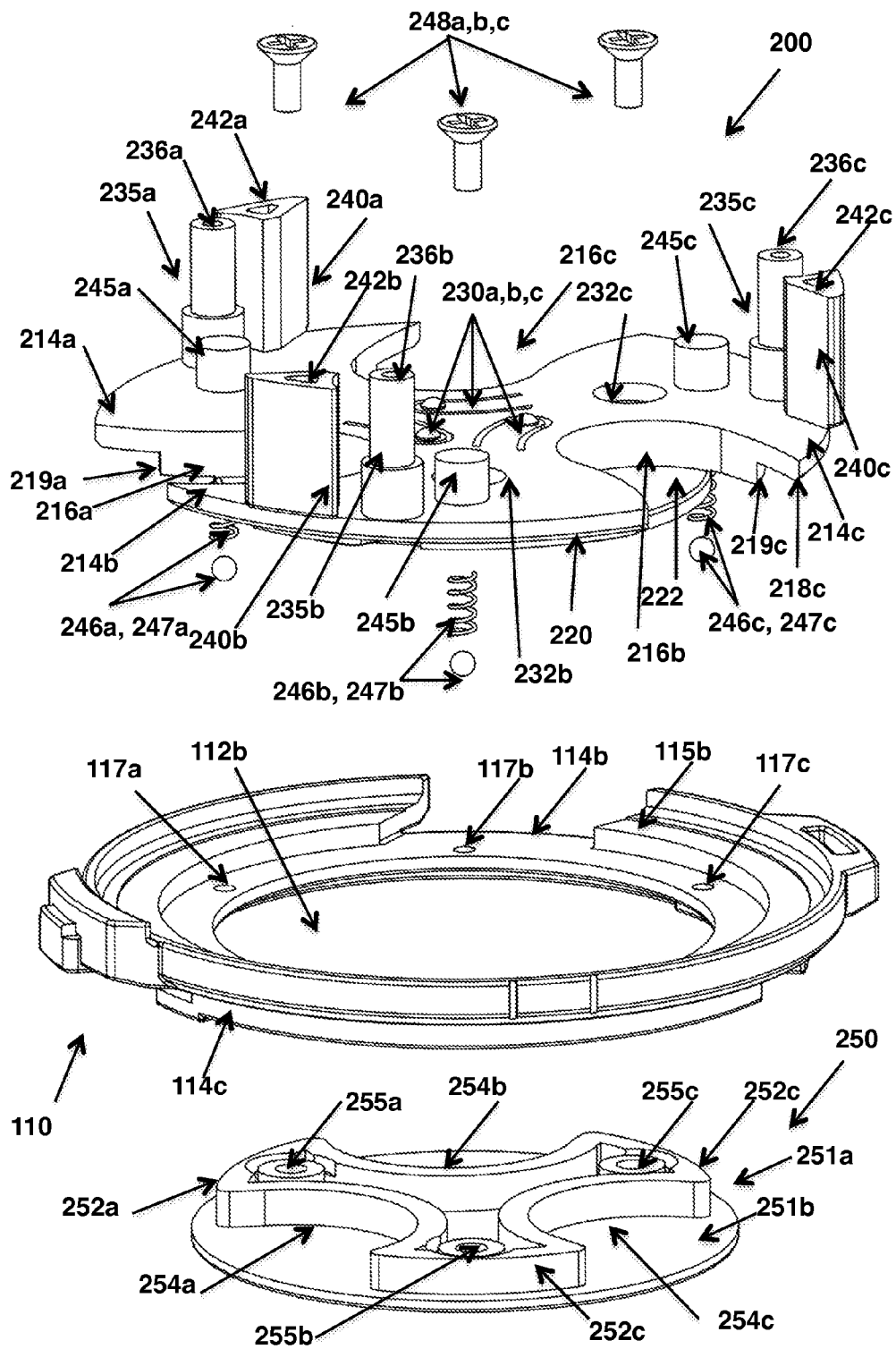
FIGS. 2A-2B are a perspective view of the base plate of FIG. 1B and exploded views of the upper and lower rotatable lens support plates (FIG. 2A) and the assembled rotatable lens support assembly (FIG. 2B).

FIG. 2A are structural views of the components of the rotatable lens turntable in relationship to the base plate. The upper lens plate 210 comprises an upper plate portion 212a comprising three arms 214a,b,c to which the lens holders are secured (see FIG. 3A) which form three inwardly arcuate openings 216a,b,c between pairs of arms. The edges of the arms form a plate lip 218a,b,c (218a,c shown). The upper plate portion is disposed on the upper surface 222 of the lower plate portion 220.

The upper surface of the upper plate portion comprises means for securing the lens holders 300a,b,c, such as a track with stop combination 230a,b,c disposed at the center thereof. The lens holder stops have a raised hemispherical shape formed from or on the upper plate portion surface. These are structurally configured to receive and engage with a corresponding depressions 314a,b,c formed on the lower surface edge of the lens holder (see FIG. 3B) to secure the lens within the external lens device sufficiently such that movement or jostling will not dislodge the lens holder. When a user wishes to utilize a lens, lifting the lens by the lens holder lip 305a,b,c (see FIG. 3A) is sufficient to disengage the lens holder from the stop.

Each arm comprises an interiorally threaded female attachment openings 232a,b,c (232b,c shown) disposed through the upper and lower lens plates. Each arm comprises a substantially cylindrical first sleeve 234a,b,c disposed at the edge thereof and extending upwardly therefrom. Each first sleeve has an upper portion with a threaded female attachment opening 236a,b,c on the upper surface thereof and a lower portion with a diameter greater than that of the upper portion which forms a platform on which lens spring 330a,b,c (see FIG. 3A) is supported when disposed over the outside of the upper portion. Each arm comprises a spacer 240a,b,c having a substantially prism shaped body with an arcuate outer surface that are uniformly disposed at the edge thereof and extending upwardly therefrom and proximate to the first sleeve. Each spacer comprises a spacer opening 242a,b,c disposed in the upper surface thereof. Each arm comprises a substantially cylindrical second sleeve 245a,b,c disposed to extend downwardly through the upper and lower plate portions and structurally configured to receive spring 246a,b,c through the open downward end. Bearings 247a,b,c are disposed within the lower ends of the springs and structurally configured to engage or mate with depressions 117a,b,c on the second rim 114b upper surface of the base 110 to hold the turntable in place. The turntable stays in place until rotated by a user.

A lower lens plate 250 has a diameter such that it fits within the opening on the lower surface 112b formed by the third rim 114c on the base plate 110 and closes the same to form a substantially smooth surface with the outer surface of the third rim. An attachment structure 251a extends upwardly from the upper surface 251b of the lower lens plate and has three arms 252a,b,c forming inwardly arcuate openings 254a,b,c structurally and alignably corresponding with the arms and arcuate openings formed on the upper lens plate 200. Each arm comprises an interiorly threaded female attachment opening 255a,b,c that aligns with attachment openings 232a,b,c on the upper lens plate 200. When the lip 218a,b,c and lower edges 219a,b,c (219a,c shown) of the upper plate portion rest or are seated on the first rim flange portion 115b and second rim 114b, respectively, of the base 110 and the lower lens plate is seated to circumferentially abut the edge of the third rim, screws 248a,b,c secure the upper lens plate to the lower lens plate and thereby rotatably secures the turntable to the base.

Figure 2B:
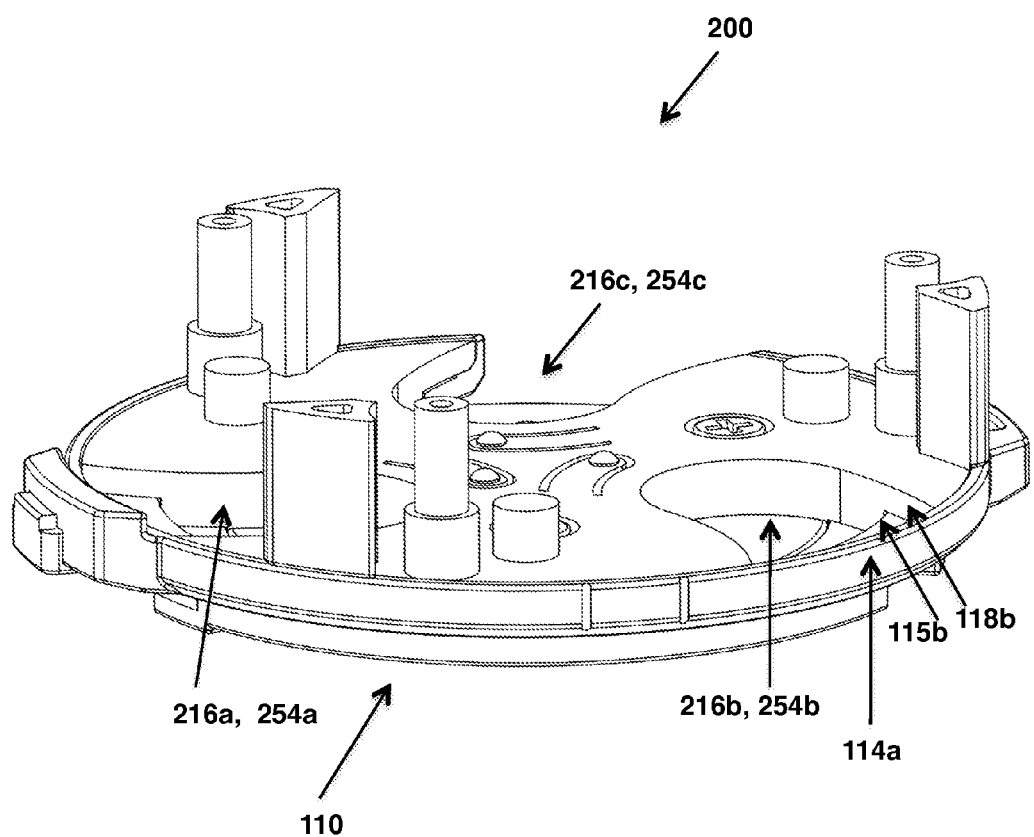

FIG. 2B depicts the assembled rotatable lens turntable as secured to the base plate. Particularly, it can be seen how the lip 118c rotatably rests on the flange 115b of the first rim 114a. The arcuate openings 216a,b,c and 254a,b,c are always enclosed by the first rim as the turntable is rotated so that the lens holders 300a,b,c (see FIG. 3C) cannot rotate out of the external lens device during rotation, handling or other movement.

Figure 3A:
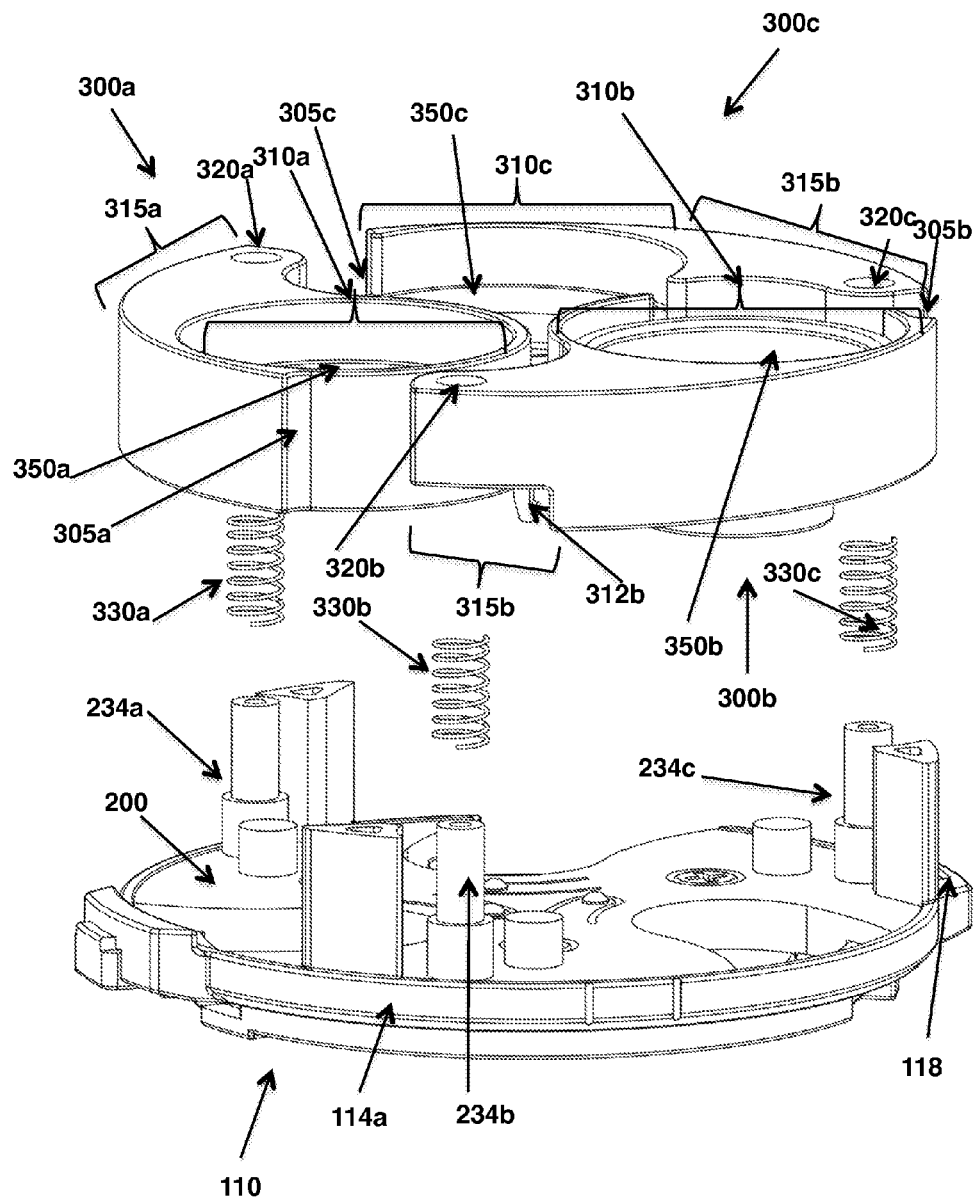
FIGS. 3A-3D are perspective exploded and assembled views of the rotatable lens support assembly of FIG. 2B and the lenses from a top view (FIG. 3A) and a bottom view (FIG. 3B), the assembled rotatable lens assembly (FIG. 3C), and a cutaway bottom view showing a lens holder within the assembly (FIG. 3D)

With continued reference to FIG. 2B, FIG. 3A is a structural top perspective view of the lens holders in relationship to the lens turntable. A plurality of lens holders 300a,b,c have an elongate body with a comma-like shape with an arcuate contour such that the curve formed by the outer surface coincides with that of the first rim 114a on the base plate 110. The lens holders each comprise a lens holding portion 310a,b,c and a securing portion 315a,b,c. Each lens holding portion contains a lens 350a,b,c affixed therein such that the upper lens surface is positioned below the upper surface of the lens holder. The securing portions comprise a substantially cylindrical opening 320a,b,c disposed through the upper and lower surfaces thereof at the edge of the securing portion. The cylindrical openings have an inner diameter to receive therein lens springs 330a,b,c and the first sleeves 234a,b,c when the lens holders are disposed on the turntable 200.

The edge of the arcuate outer surface proximate to the lens holding portion comprises a lip 305a,b,c structurally formed as a means for swiveling the lens holders outwardly around first sleeves 234a,b,c to lift it out for positioning in front of the camera lens on the smartphone. A flanged clip 312a,b,c (312b is shown; see FIG. 3B) depends downwardly from the inner surface of the securing portion and is disposed proximate to the lens holding portion. After assembly, the turntable is rotated such that an opening, as represented by 216b, 254b containing the lens holding portion is aligned with opening 116 in the base plate 110 (see FIG. 2B). The lens holder is swiveled outwardly around first sleeve 234a,b,c and a user may push the lens holder downwardly to engage the flanged clip with the slot 118 or bracket on the base plate 100 to secure the lens so that it doesn't swivel away from the camera lens during use. To release the lens holder a user pushes the lens holder upwardly to disengage the flanged clip thereby enabling the lens holder to be swiveled back into the external lens device.

Figure 3B:
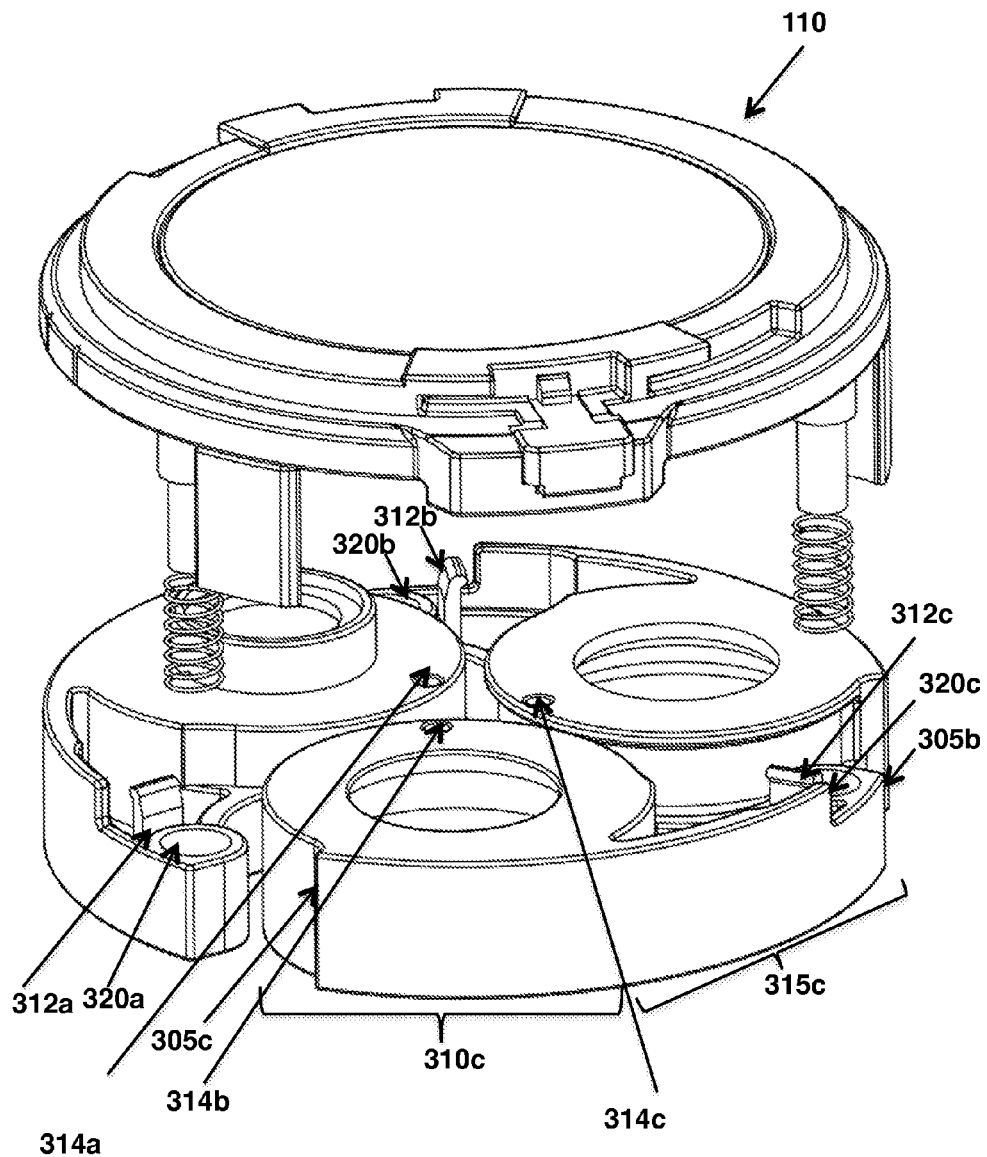

FIG. 3B is a structural bottom perspective view of FIG. 3A. The inner surfaces of the lens holding portions, as represented by 310c, comprise depressions 314a,b,c in the surface which aligns with the track with stop 230a,b,c (see FIG. 2A) on the upper lens plate 200 and is secured thereby when the lens holders are disposed within the exterior. This perspective illustrates the positional relationship among the flanged clips 312a,b,c, the cylindrical openings 320a,b,c and the lens holding portion lip, as represented by 305b,c on the securing portions, as represented by 315c, of the lens holder.

Figure 3C:
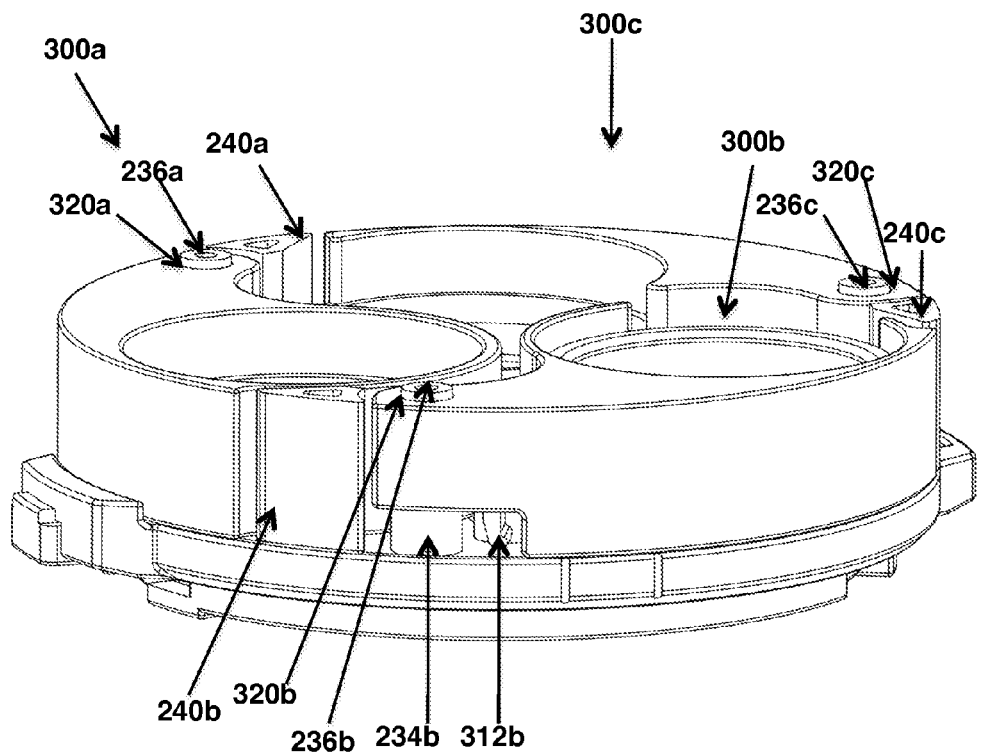

FIG. 3C depicts the turntable with the lens holders disposed thereon. The securing portions of the lens holders are placed over the first sleeves, as represented by 324b, with springs combination (see FIG. 3A). The upper portion of the first sleeves extend from within the upper end of the cylindrical openings 320a,b,c such that threaded female attachment openings 236a,b,c thereof is accessible. This perspective illustrates the positional relationship of the flange clip, as shown by 312b with respect to the first sleeve, as shown by 234b. This perspective also illustrates the positional relationship of the spacers 240a,b,c on the turntable to the lens holders. When positioned on the turntable the arcuate contours of the outer surfaces of the lens holders and the spacers form the outer surface of the external lens device.

Figure 3D:
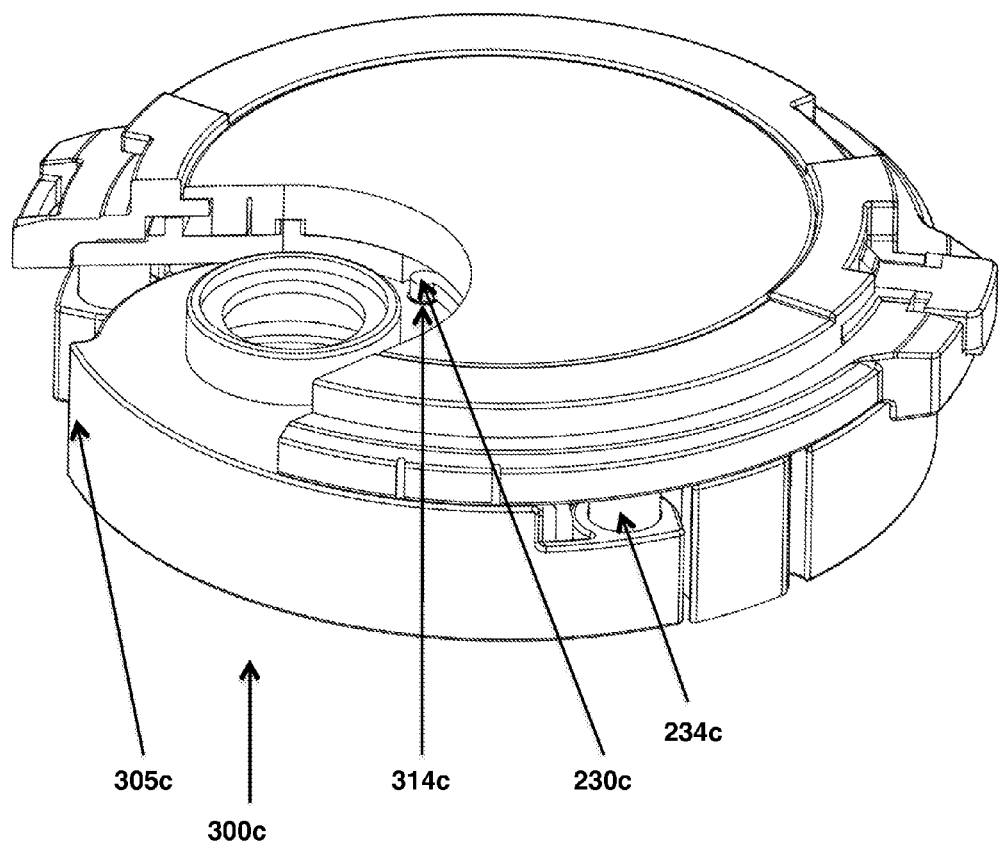

FIG. 3D is a bottom and side perspective view of the turntable with a cutaway illustrating the securement of the lens holder. Depression 314c is engaged with the track with stop 230c. The lens holding portion lip 305 on the lens holder 300c is easily accessible by a user to lift the lens holder off the stop and swivel the lens around the sleeve 234c.

Figure 4A:
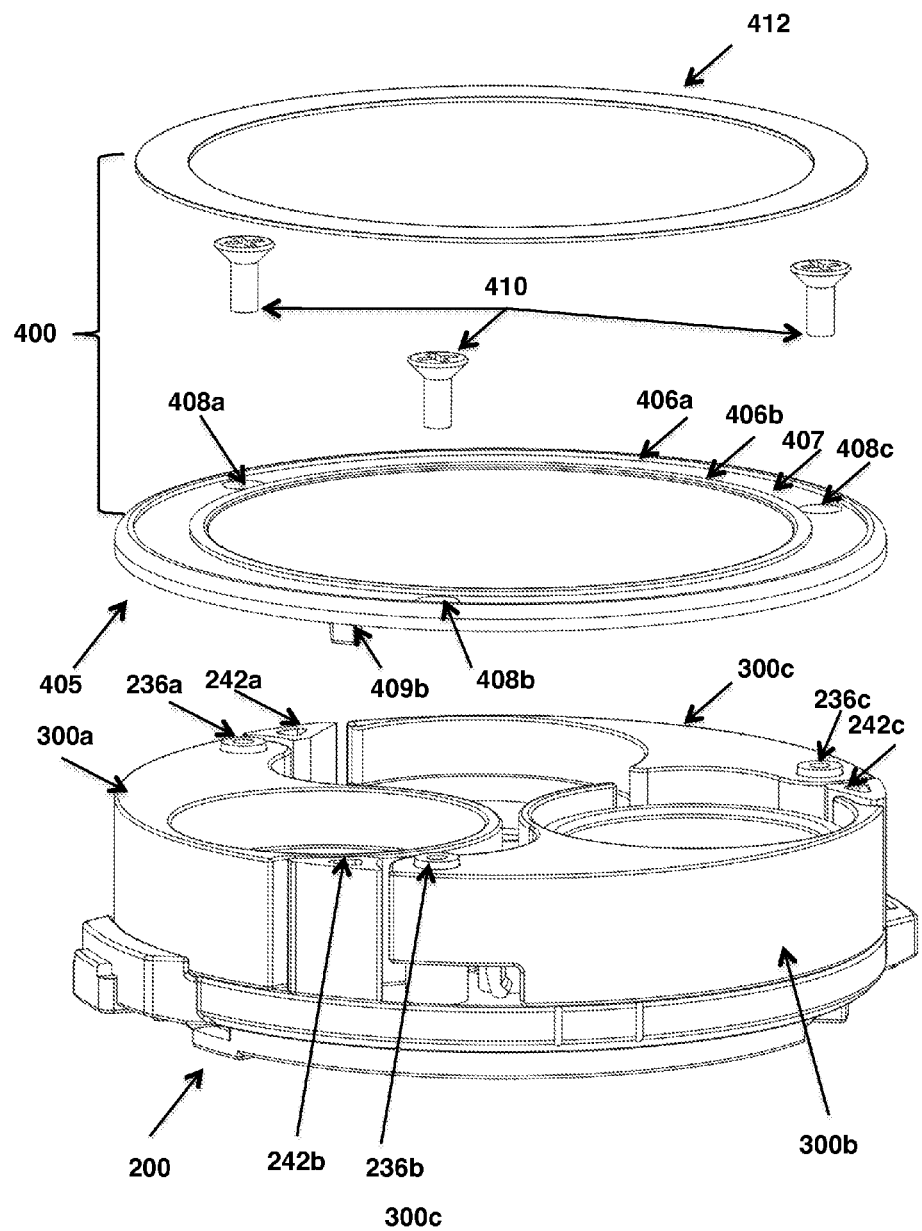
FIGS. 4A-4C are a perspective view of the rotatable lens assembly of FIG. 3B and the upper and lower lens cover plates (FIG. 4A), the rotable lens assembly with lower lens cover plate secured thereto (FIG. 4B), and the assembled external lens device with the upper lens cover plate secured thereto (FIG. 4C).

With continued reference to FIG. 3C, FIG. 4A is a structural perspective view of the cover for the external lens device with respect to the turntable. A circular cover 400 comprises an upper covering plate 412 and a lower covering plate 405. The lower covering plate comprises outer and inner rims 406a,b circumferentially raised around the upper surface thereof and forming a channel 407 between the same. The lower covering plate has an outer diameter corresponding to the diameter across the lens holders 300a,b,c when secured to the turntable 200. The lower covering plate comprises a plurality of cover openings 408a,b,c therethrough disposed between the outer and inner rims and a plurality of securing anchors, as represented by 409b, disposed on the lower surface thereof and depending downwardly. The lower covering plate is positioned over the lens holders such that the cover openings align with the threaded attachment openings 236a,b,c on the first sleeves and the securing anchors are inserted into the corresponding spacer openings 242a,b,c to keep the lower covering plate in position. Cover screws 410a,b,c threadably attach the lower cover plate to the lens holders through the cover openings into the threaded attachment openings on the sleeves.

Figure 4B:
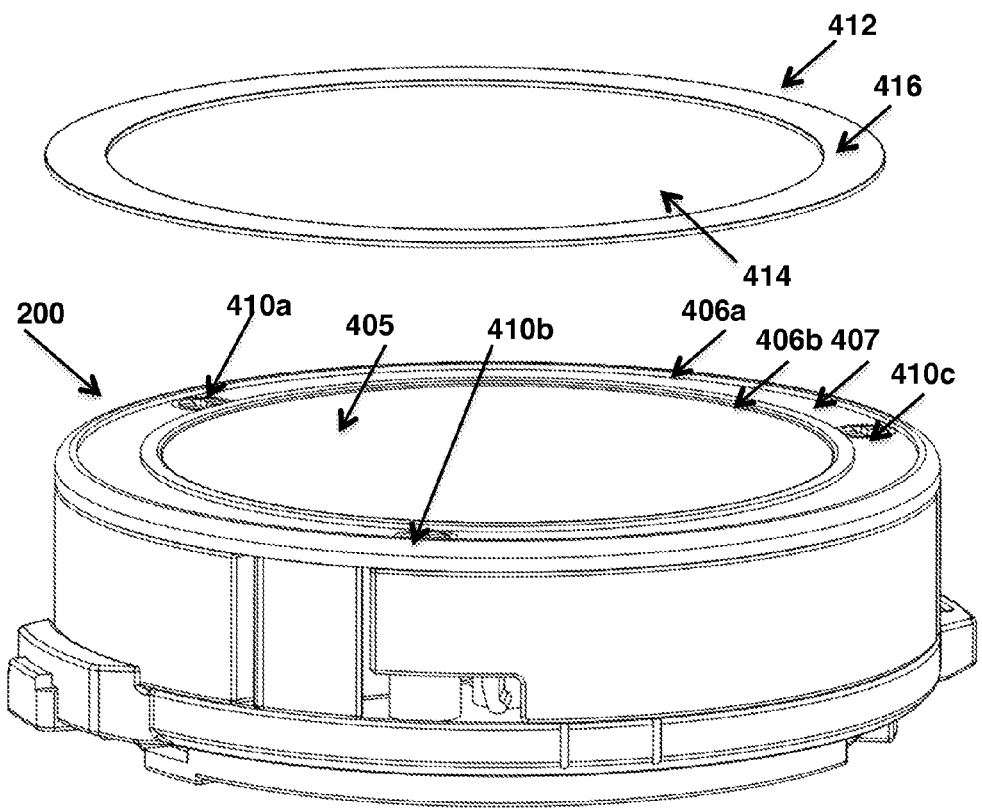
Figure 4C:
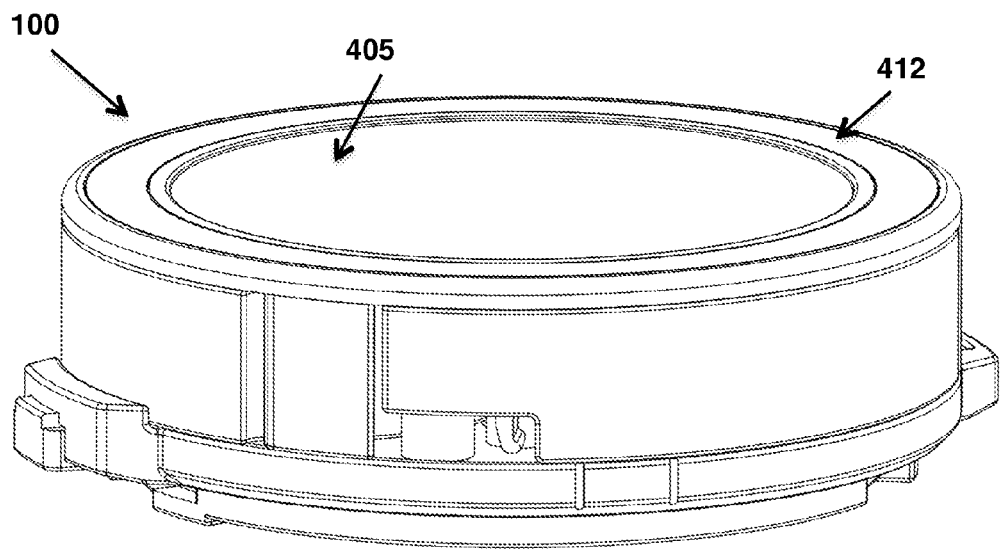

FIG. 4B is a structural perspective view of the upper covering plate in relation to the lower covering plate on the turntable 200. The upper covering plate 412 has an open center 414 and a rim 416 with a diameter that enables accommodation in the channel between the outer and inner cover rims 406a,b on the lower covering plate 405. The upper covering plate may be secured by pushing or inserting it into the channel 407 between the outer and inner rims on the outer covering plate where the respective diameters are such that the upper covering plate is securely held in place. Alternatively, the upper covering plate may be affixed or adhered to the lower covering plate by means known and standard in the art, for example, but not limited to, an adhesive or glue FIG. 4C is a top and side perspective view of the assembled external lens device 100 illustrating the placement and securement of the cover thereto. The upper covering plate 412 covers the heads of the screws 410a,b,c (see FIG. 4B) securing the lower covering plate 405 to the lens holders to form a substantially smooth surface.

Figure 5:
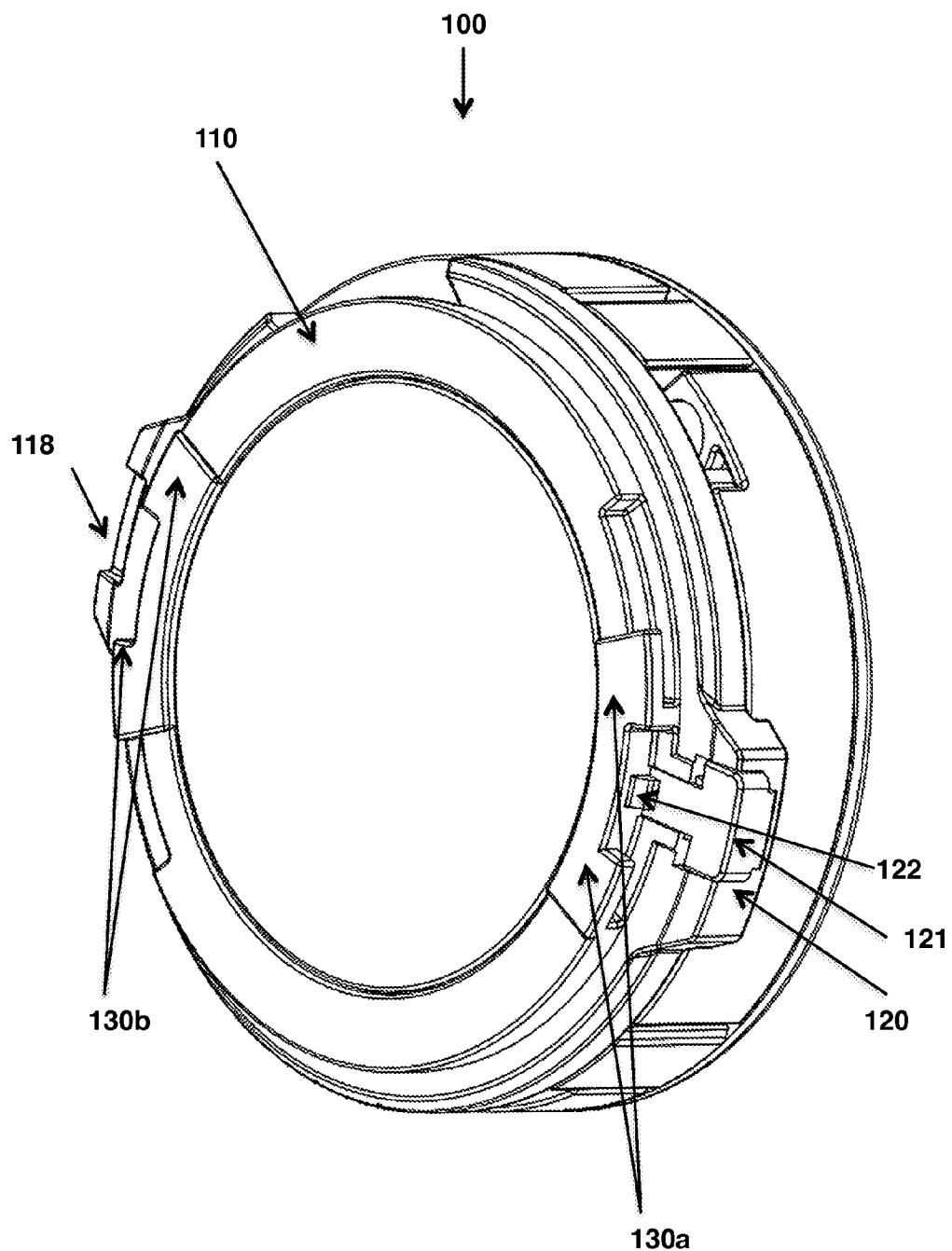
FIG. 5 is a bottom and side perspective view of the assembled external lens device.

With continued reference to FIG. 1A, FIG. 5 is a bottom and side perspective view of the external lens holder 100. The positions of the release mechanism 120 and the slot 118 or bracket on the base plate 110 are illustrated. Each is disposed proximate to a pair of the L-shaped slots 130a,b. It is readily apparent from this perspective that when the L-shaped slots on the base plate are mated with the L-shaped slots 630a,b on the mount 600 (see FIG. 6A) where pushing the push button 121 on the release advances the flanged end 122 to engage with the L-shaped slot on the mount. Release of the push button causes the release spring 124 (see FIG. 1A) contained therein to decompress which pulls the flange back against the edge of the slot to secure it to the mount. Recompressing the release spring 124 frees the flange from the L-shaped slot on the mount and enables the external lens device to be released from the mount.

Figure 6A:
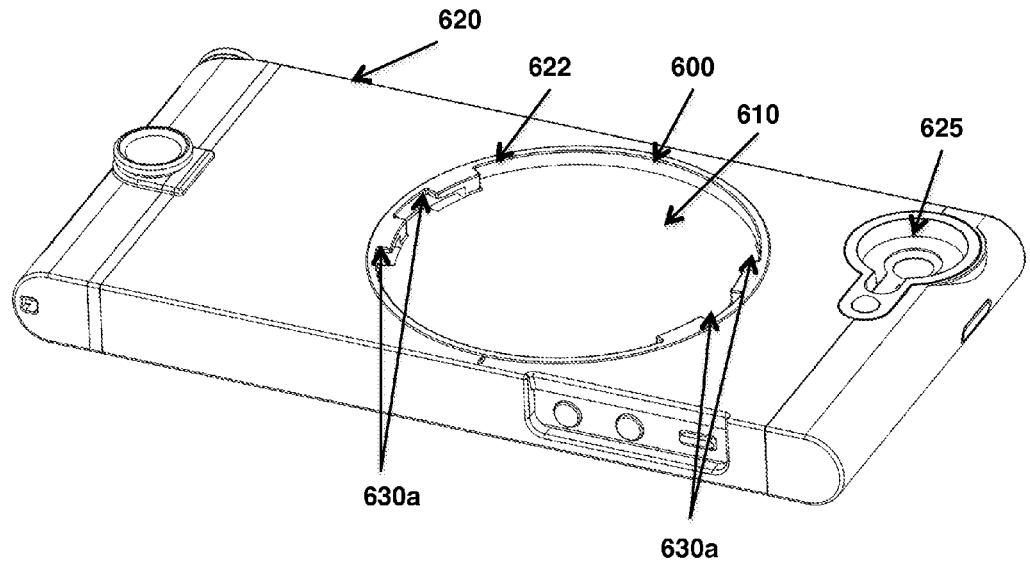
FIGS. 6A-6B depict the mount base (FIG. 6A) with which to secure the external lens device and illustrates the alignment of the external lens device with the mount base (FIG. 6B).

FIG. 6A depicts the mount for the external lens device. The mount 600 is disposed on or formed on the back of a smart device such as a smartphone 620. The mount has a substantially cylindrical body forming a shallow cavity on the back with an open upper surface level with the back surface 622 of the smart device. A receiving means 630a,b, such as two pair of L-shaped slots or reverse L-shaped slots are formed on the inner surface 610 of the cylindrical body between the upper edge and lower surface thereof. Each pair of L-shaped slots 630a,b is disposed in opposite relationship on the inner surface. The receiving means is structurally configured with an inner diameter for removably receiving and securing the corresponding engaging means on the base plate such that when secured the base plate 110 is in contact with the lower surface of the mount and the turntable 200 may be rotated on the base plate to position a lens over the camera lens 625 on the smartphone (see FIGS. 7A-7B).

Figure 6B:
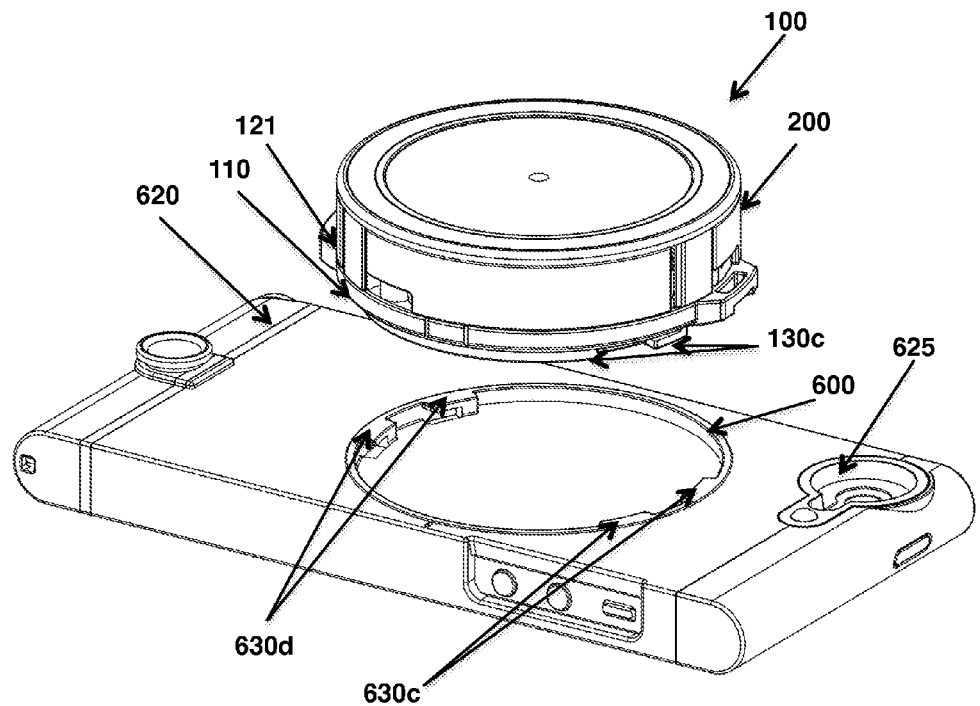

FIG. 6B is a structural perspective view of the base plate in relation to the mount on the smartphone. The external lens device 100 is positioned by a user such that the engaging L-shaped slots 130a,b are proximate to the slot 118 on the base plate 110 and are aligned with the receiving L-shaped slots 630a,b on the mount 600 proximate to the camera lens 625 on the smartphone. This naturally aligns the feet 130c,d of the L-shaped slots (feet 130c are shown) with receiving L-shaped slots 630a,b. The user depresses push button 121 to engage the base plate with the mount and the feet 130c,d of the L-shaped slots are positioned at 630a,b. The external lens device is twisted to secure the feet within the feet 630c,d of the receiving L-shaped slots 630a,b.

Figure 7A:
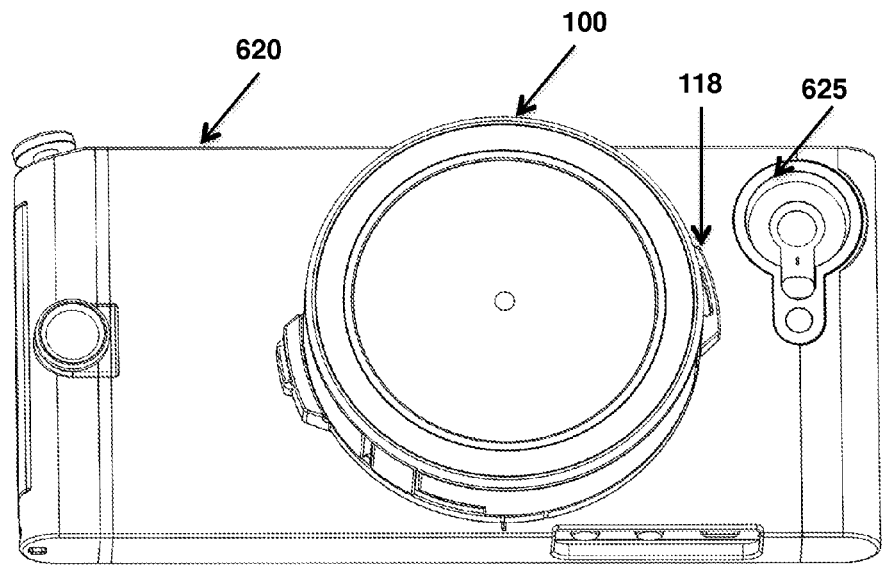
FIGS. 7A-7B illustrate the external lens device secured to the mount base (FIG. 7A) and one of the lenses rotated outwardly into position over the smartphone camera lens (FIG. 7B).

FIG. 7A illustrates the external lens device secured to the mount. The external lens device 100 is mounted on the smartphone 620 with the slot 118 proximate to the camera lens 625. When a lens holder (see FIG. 7B) is swiveled out, the flanged clip on the lens holder can engage the slot 118 thereby preventing the lens holder from moving when the lens is in use.

Figure 7B:
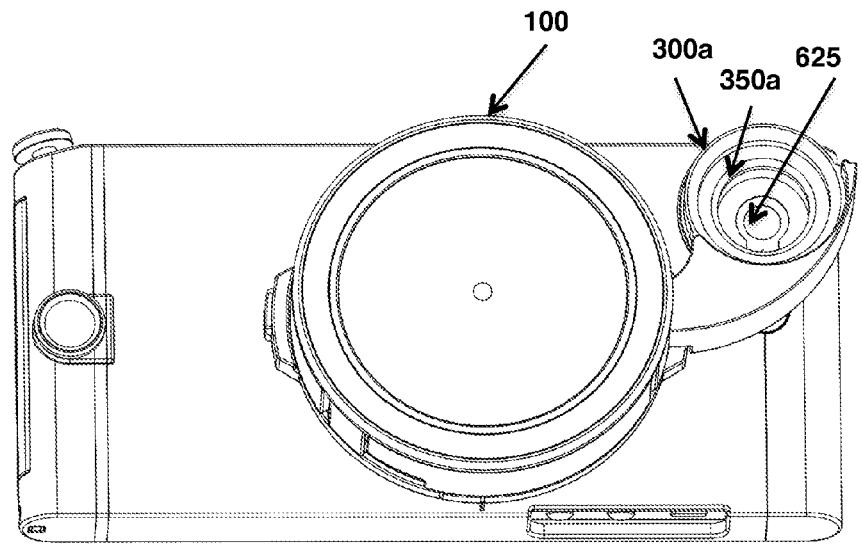

FIG. 7B illustrates a lens positioned over the camera lens on the smart phone. A lens holder 300a is swiveled out of the external lens device 100 and docked such that the lens 350a is over the camera lens 625 on the smartphone 620. The diameter of the external lens device is less than the width of the smartphone. The structural configuration of the external lens device has dimensions so that when the lens is positioned over the camera lens and secured in place, the footprint of the device including the lens holder in use is accommodated within the area defined by the back of the smartphone.

Figure 8A:
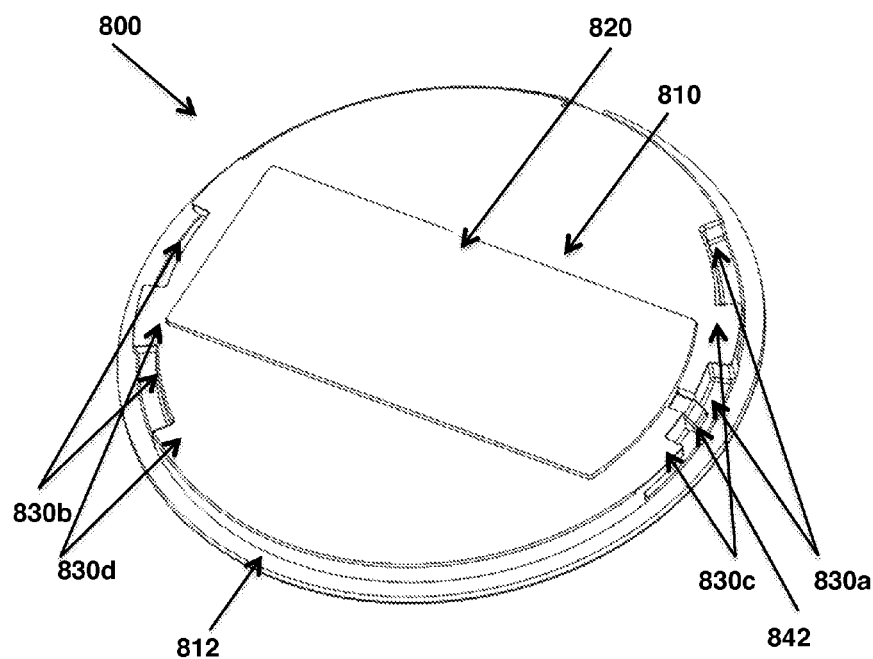
FIGS. 8A-8B are perspective views of the lower surface with cleaning pad (FIG. 8A) and the upper surface (FIG. 8B) of a cleaning device for a smartphone.
Figure 8B:
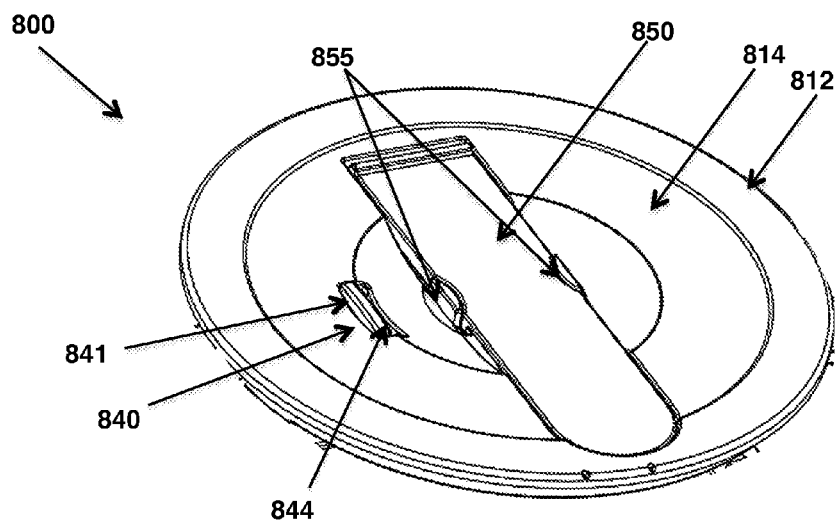

With continued reference to FIG. 6A, FIGS. 8A and 8B depict a cleaning device for cleaning the screen on a smartphone. The cleaning device 800 has circular body with circular upper and lower body portions 810 and 812 and is structurally configured to engage with and be secured to the mount 600 (see FIG. 9A). FIG. 8A illustrates the lower body portion of the cleaning device which depends downwardly from the lower surface of the upper body portion and has a diameter less than that of the upper body portion. Similar to the base plate 110 (see FIG. 3B), the lower body portion comprises an engaging means 830a,b,c,d with two pair of slots 830a,b, such as L-shaped slots or reverse L-shaped slots, including the feet 830c,d formed thereon to engage the receiving means 630a,b,c,d (see FIG. 6A) each pair disposed in opposite relationship on the lower body portion.

A release mechanism 840 comprising a flanged end 842 and a lever end 841 (see FIG. 8B) is disposed on the outer edge of the lower body portion along one of the L-shaped slots. The flanged end is engageable with the foot 630c,d of one of the corresponding receiving L-shaped slots 630a,b on the mount (see FIG. 9A). The lever end extends through a lever slot 844 disposed on the upper surface of the upper body portion.

A cleaning pad 820 is attached or secured to the lower surface of the lower body portion lengthwise between the pairs of L-shaped slots. The dimensions of the cleaning pad are such that the edges thereof do not cover or obscure the L-shaped slots and release mechanism.

FIG. 8B illustrates the upper body portion of the cleaning device. The upper surface 814 of the upper body portion comprises a kickstand 850 disposed thereon and securable with brackets 855a,b when not in use. A lever slot 844 is formed through the upper and lower body portions and aligns with the lever end 841 of the release mechanism. The lever end extends upwardly from the lower surface of the lower body portion through lever slot.

Figure 9A:
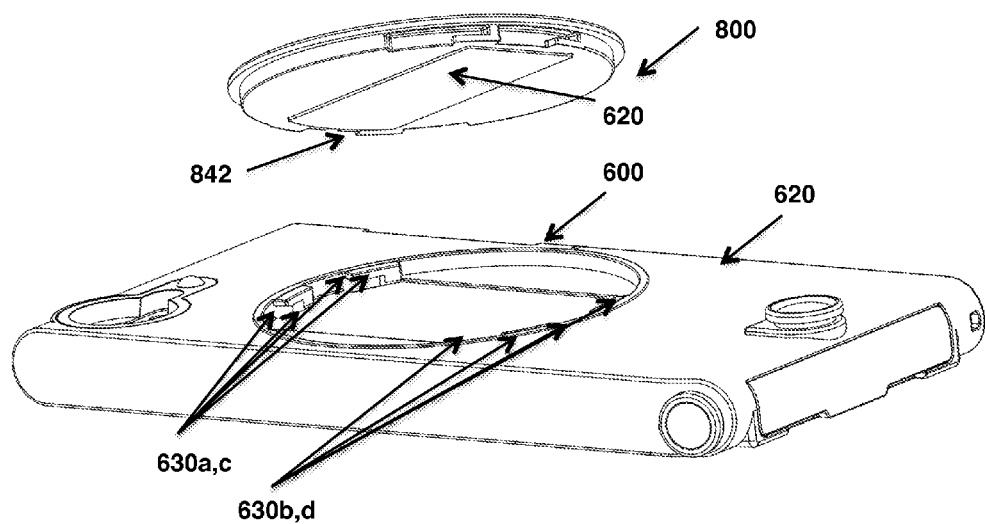
FIGS. 9A-9B depict the mount base for the cleaning device illustrating alignment of the cleaning device from the lower perspective (FIG. 9A) and from the upper perspective (FIG. 9B).

With continued reference to FIGS. 8A and 8B, FIGS. 9A and 9B are bottom and top structural perspective views of the cleaning device in relation to the mount on the smartphone. FIG. 9A illustrates the alignment of the L-shaped slots on the cleaning device 800 with the corresponding L-shaped slots on the mount. The cleaning device is positioned by a user such that the engaging L-shaped slots/feet 830a,b,c,d (see FIG. 8B) are aligned with the receiving L-shaped slots/feet 630a,b,c,d on the mount 600 on the smartphone 620. The user pushes the lever forward to engage the lower body portion of the cleaning device with the mount and the feet 830c,d of the L-shaped slots are positioned at 630a,b. The cleaning device is twisted to secure the feet within the feet 630c,d of the receiving L-shaped slots.

Figure 9B:
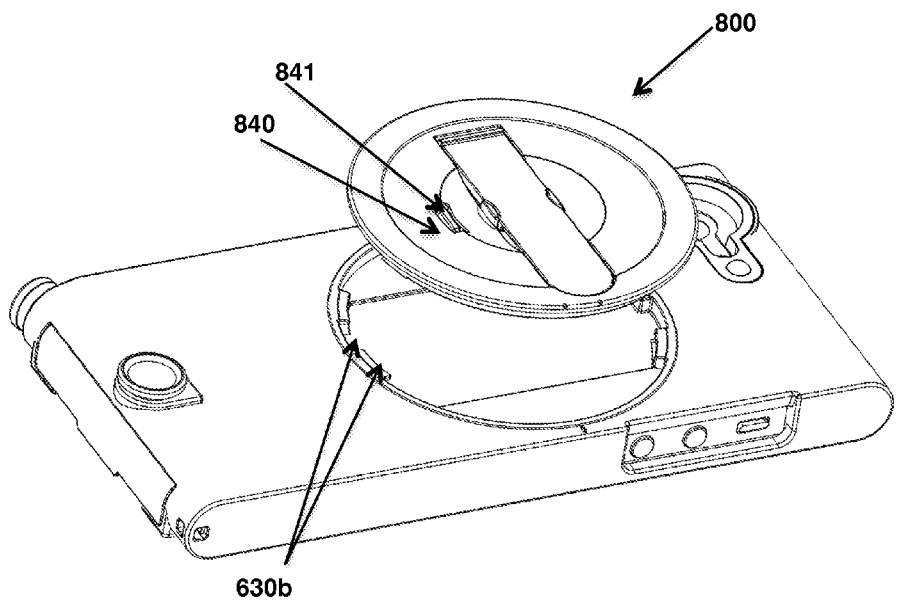

FIG. 9B illustrates the alignment of the release mechanism in relation to the mount on the smartphone. It is readily apparent from this perspective and from that provided in FIG. 8A that when the L-shaped slots on the cleaning device are mated with the L-shaped slots on the mount, pushing the lever 841 on the release mechanism 840 forward retracts the flanged end 842 so that the feet 830d on the engaging L-shaped slots may be received within the receiving L-shaped slots/feet 630b,d on the mount. Release of the lever 841 causes the flanged end to extend and engage with the edge of the slot to secure it to the mount. To release the cleaning device a user may push the lever forward while twisting the device free of the receiving L-shaped slots and pulling the same out of the mount.

Figure 10A:
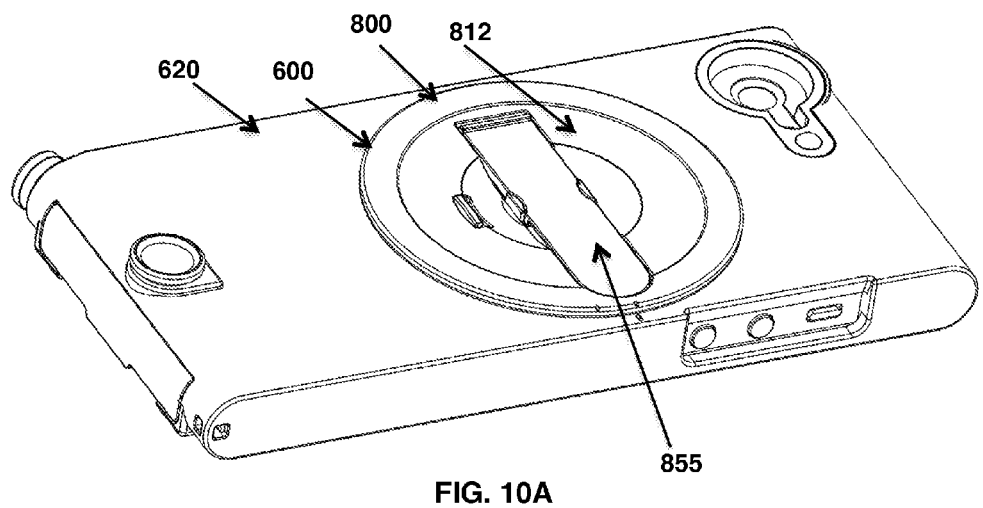
FIGS. 10A-10B illustrate the cleaning device secured to the mount base (FIG. 10A) and illustrate how the cleaning device is utilized to clean the screen of a smartphone (FIG. 10B).

With continued reference to FIGS. 9A and 9B, FIG. 10A illustrates the cleaning device 800 secured to the mount 600. When secured the combination of the lower body portion 610 and the shallow cylindrical body of the mount forms a protective cavity for the cleaning pad (see FIG. 9A). The diameter of the upper body portion 812 of the cleaning device is less than the width of the smartphone 620. The structural configuration of the cleaning device including the kickstand 850 has dimensions such that the footprint of the cleaning device when secured to the mount is accommodated within the area defined by the back of smartphone.

Figure 10B:
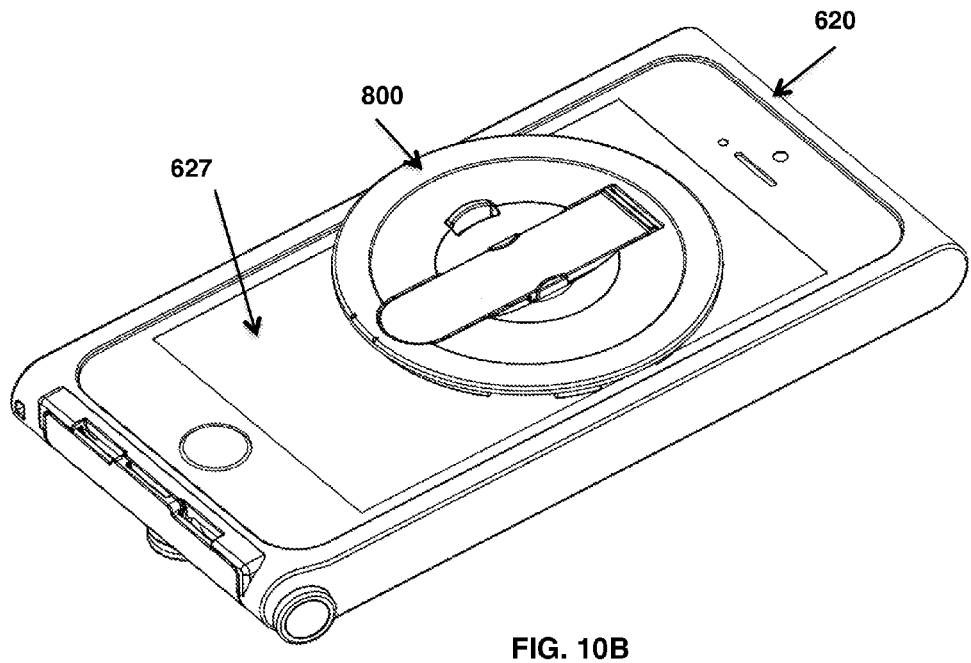

FIG. 10B illustrates use of the cleaning device. The cleaning pad 820 (see FIG. 6A) on the cleaning device 800 is utilized to clean the screen 627 on the smartphone. A user may grip the edge of the upper body portion 820 and clean the screen with the cleaning pad (see FIG. 8A) in any orientation. The footprint of the cleaning device, including the cleaning pad, is accommodated within the area of the screen.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. An external lens device for a smart device, comprising:
  a base plate removably securable to a mount on the smart device, comprising:
    a substantially circular body having a plurality of rims defining open upper and lower surfaces on the body, said plurality of rims comprising:
      a first rim with an upwardly vertical portion having an opening therethrough and a flange portion extending laterally and inwardly from said vertical portion;
      a second rim disposed under and in contact with the flange portion of the first rim and extending laterally and inwardly therefrom, said second rim having a plurality of stops formed around the upper surface thereof; and
      a third rim disposed under and in contact with the second rim and having a diameter equal to or less than that of the second rim, said third rim having means for removably engaging the mount formed on an outer edge thereof;
    a release mechanism disposed on the first rim; and
    a slot formed from the first rim in opposite relationship to the release mechanism;
  a turntable attached to and rotatable on the base plate;
  a plurality of lens holders disposed on the turntable in a swiveling relationship therewith;
  a plurality of lenses each secured within a lens holder; and
  a cover disposed in covering relationship to the lens holders and attached thereto.

2. The external lens device of claim 1, wherein the release mechanism comprises a push button with a flanged end in combination with a spring and is positioned on the first rim such that the flanged end extends into the engaging means on the third rim.

3. The external lens device of claim 2, wherein the engaging means comprises two pairs of L-shaped slots disposed in opposite relationship on the exterior of the third rim.

4. The external lens device of claim 1, wherein the turntable comprises:
  an upper lens plate having:
    a substantially circular upper plate portion having a lip on an outer edge thereof such that the upper plate portion is seated on both of the flange portion of the first rim and the second rim;
    a circular lower plate portion seated within the open lower surface formed by the second rim; and
    a plurality of attachment openings disposed through the upper and lower plate portions; and
  a lower lens plate seated within the open lower surface formed by the third rim and having a plurality of attachment openings on an upper surface thereof in alignment with the attachment openings on the upper lens plate, said lower lens plate attached to the upper lens plate via the aligned attachment openings such that said upper and lower lens plates rotate together around the first and second rims.

5. The external lens device of claim 4, wherein the upper lens plate comprises
  a plurality of arms with arcuate exterior contours radially extending from a center thereof and defining a plurality of lens plate openings with arcuate interior contours between the arms, each of said lens plate openings sequentially alignable with the first rim opening as the turntable is rotated.

6. The external lens device of claim 5, wherein the upper lens plate further comprises on each arm:
  a stop raised from the surface of the arm with dimensions that match a corresponding depression on the lens holder;
  a spacer having an arcuate exterior contour disposed on the edge of the arm extending upwardly therefrom and comprising an attachment opening on an upper surface thereof;
  a first sleeve extending upwardly from the upper lens plate having an attachment opening disposed on an upper surface thereof and having a spring disposed around the exterior thereof;
  a second sleeve extending downwardly through the upper and lower lens plates and having an open lower surface; and
  a spring and bearing combination disposed within the second sleeve, said bearing having dimensions matching the stops comprising the second rim such that the turntable remains in position on the base plate after said bearing engages the second rim stop after the turntable is rotated.

7. The external lens device of claim 4, wherein the lens holder has an elongate body with an exterior arcuate contour comprising:
  a lens holding portion having a lens secured therein and a lip formed between upper and lower edges of the exterior arcuate contour;
  a securing portion having an opening therethrough, said first sleeve and spring disposed therein; and
  a flanged clip disposed on a lower surface of the securing portion proximate to the lens holding portion and depending downwardly therefrom.

8. The external lens device of claim 7, wherein a lifting action on the lip on the lens holding portion causes said lens holder to swivel outwardly around the first sleeve such that said flanged clip is releasably clippable to the slot on the first rim and said lens is securely positioned in front of a camera lens on the smart device.

9. The external lens device of claim 7, wherein the lens holders are positioned on the upper lens plate between the spacers such that the exterior arcuate surfaces of the lens holders and the spacers form a substantially continous arcuate surface around the base plate.

10. The external lens device of claim 4, wherein the cover comprises:
- a circular lower covering plate having outer and inner rims raised circumferentially around an upper surface thereof and comprising:
  - a plurality of anchors disposed on a lower surface thereof in alignment with the attachment openings comprising the spacers and anchored within;
  - a plurality of openings disposed between the outer and inner rims and alignable with the attachment openings on the first sleeve;
  - a plurality of screws disposed through the cover openings and secured within the attachment openings; and
- a circular upper covering plate having an open center disposed between the outer and inner rims.

11. The external lens device of claim 1, wherein the mount has a substantially circular body with an open upper surface formed from a back of the smart device and comprises means for receiving the engaging means comprising the first rim.

12. The external lens device of claim 11, wherein the receiving means comprises two pairs of L-shaped slots disposed in opposite relationship on an interior side surface of the mount.

13. The external lens device of claim 11, wherein when the base plate is secured to the mount, the opening in the first rim is positioned proximate to the camera lens.

14. The external lens device of claim 1, wherein the lenses comprise a wide-angle lens, a telephoto lens or a fisheye lens.

15. The external lens device of claim 1, wherein the smart device is a smart phone or a tablet.

16. A handheld camera system, comprising:
- a smart device having a mount formed on the back side thereof;
- the external lens device of claim 1 removably securable to the mount; and
- a cleaning device removably securable to the mount.

17. The handheld camera system of claim 16, wherein the cleaning device comprises:
- a circular platform with an upper platform portion having a release mechanism and a kickstand disposed on an upper surface thereof and a lower platform portion with a diameter less than that of the upper platform and having means for removably engaging the mount formed on an outer edge thereof.

18. The handheld camera system of claim 16, wherein the release mechanism comprises a lever end and a flanged end disposed on the upper platform such that the flanged end extends into the engaging means on the lower platform.

19. The handheld camera system of 16, wherein the engaging means comprises two pairs of L-shaped slots disposed in opposite relationship on the lower platform portion.

* * * * *